United States Patent [19]

Hotton

[11] 4,154,641

[45] May 15, 1979

[54] APPARATUS FOR VIBRATION WELDING THERMOPLASTIC PARTS

[75] Inventor: Joseph G. Hotton, Sterling Heights, Mich.

[73] Assignee: Neumann Engineering & Manufacturing Company, Madison Heights, Mich.

[21] Appl. No.: 898,905

[22] Filed: Apr. 24, 1978

[51] Int. Cl.² .............................................. B32B 31/00
[52] U.S. Cl. ..................................... 156/580; 156/73.5
[58] Field of Search ..................... 156/73.5, 580, 580.1

[56] References Cited

U.S. PATENT DOCUMENTS

| | | | |
|---|---|---|---|
| 3,920,504 | 11/1975 | Shoh | 156/73.5 |
| 4,086,122 | 4/1978 | Bouyoucos | 156/580 |

*Primary Examiner*—Douglas J. Drummond
*Attorney, Agent, or Firm*—Cullen, Sloman, Cantor, Grauer, Scott & Rutherford

[57] ABSTRACT

Vibration welding apparatus formed of a fixed frame supporting an elongated vibration beam and a vibration motor for rapidly vibrating the beam endwise along its longitudinal axis. Compression springs positioned between the beam ends and adjacent frame portions stop the vibratory movement of the beam upon stopping of the vibration motor. A vibratory platten is fixed to the beam, and a work-piece support platten is aligned with and movable towards and away from the vibratory patten. A pair of aligned thermoplastic work-pieces are squeezed together between the plattens for tight contact of the work-piece portions to be welded together. Actuation of the vibration motor causes melting of the contacting portions of the work-pieces due to frictional generation of heat. Stopping of the motor results in immediate realignment of the plattens holding the work-pieces in proper alignment for solidifying together. The motor comprises a rotor within a chamber having opposed reciprocating pistons within cylinders opening into the chamber. Circumferential grooves formed in the rotor surface sequentially open the cylinders to a pressurized fluid outlet passageway, to move each piston outwardly, and to a fluid exit passageway to drain the cylinders for inward movement of the pistons. The pistons are axially aligned with and coupled to the beam for producing rapid, low amplitude beam vibration.

7 Claims, 10 Drawing Figures

U.S. Patent   May 15, 1979   Sheet 1 of 2   4,154,641
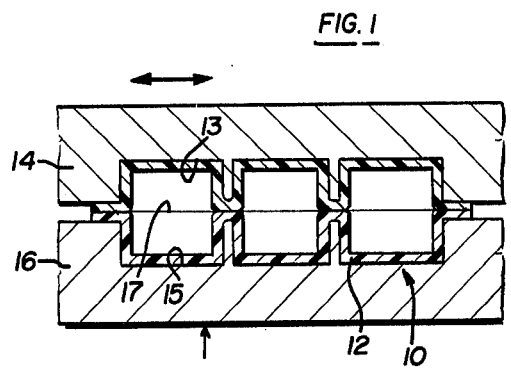
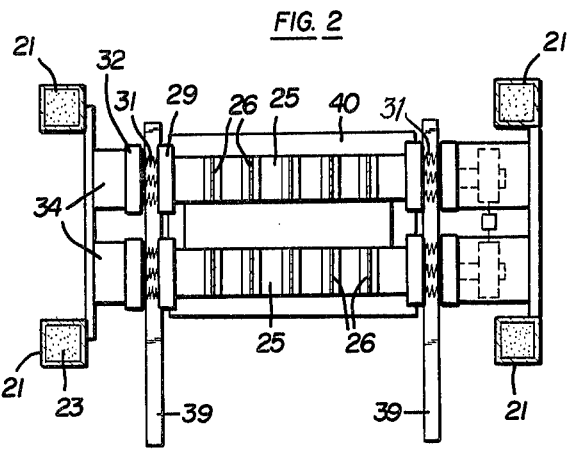
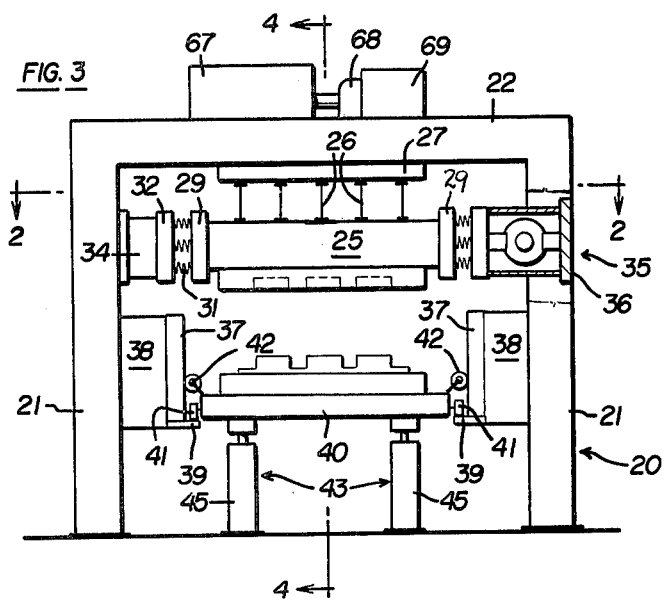
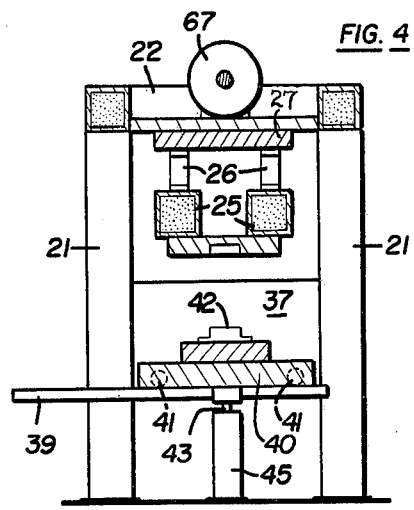
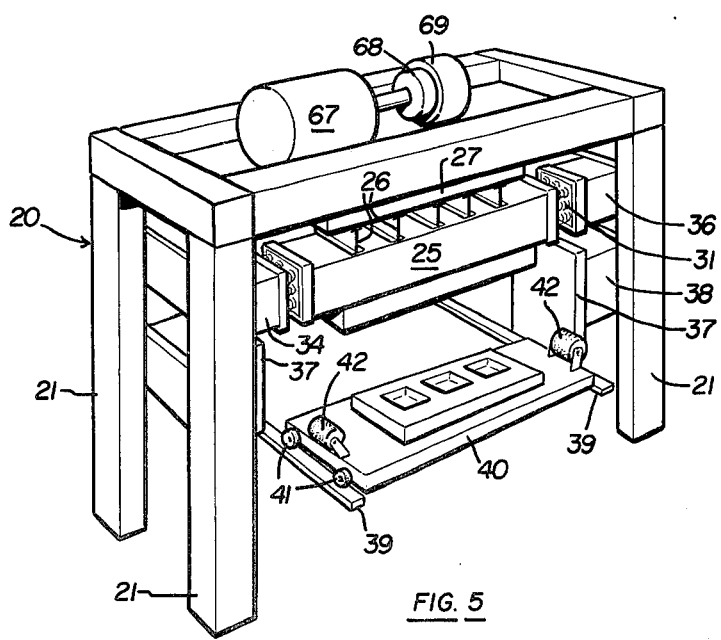
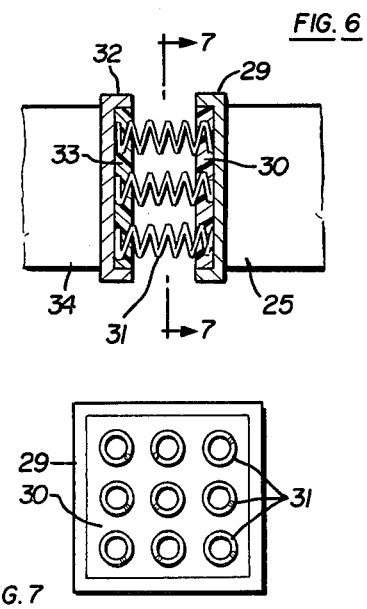

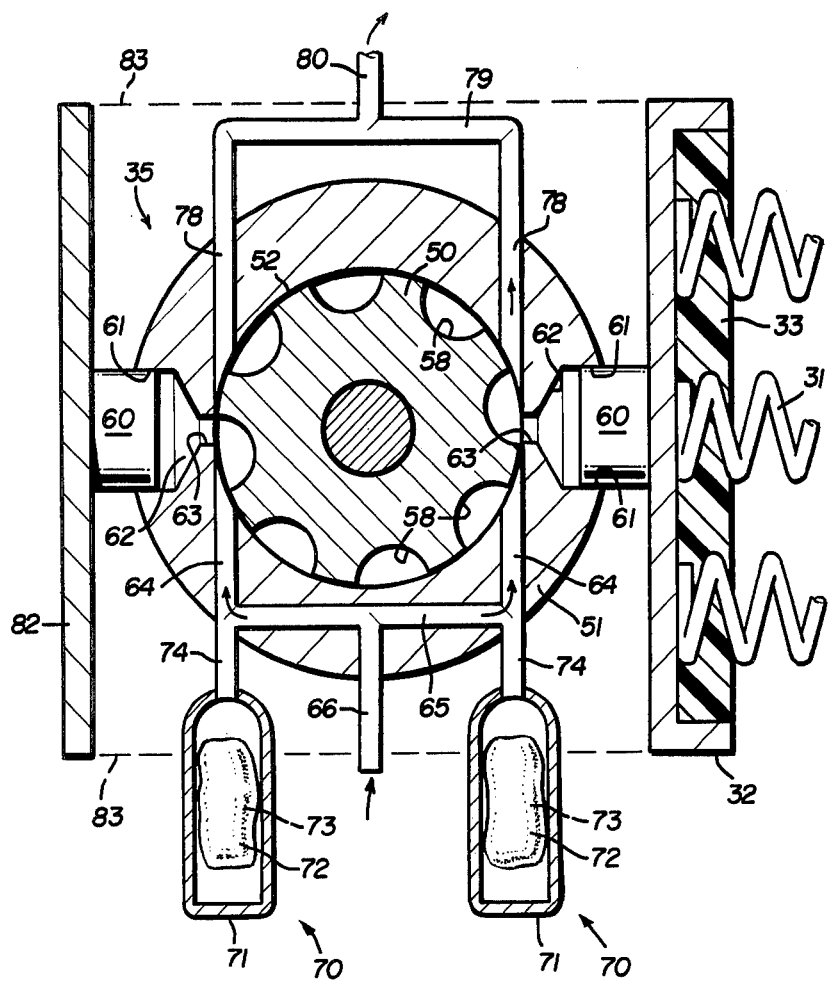
FIG. 8
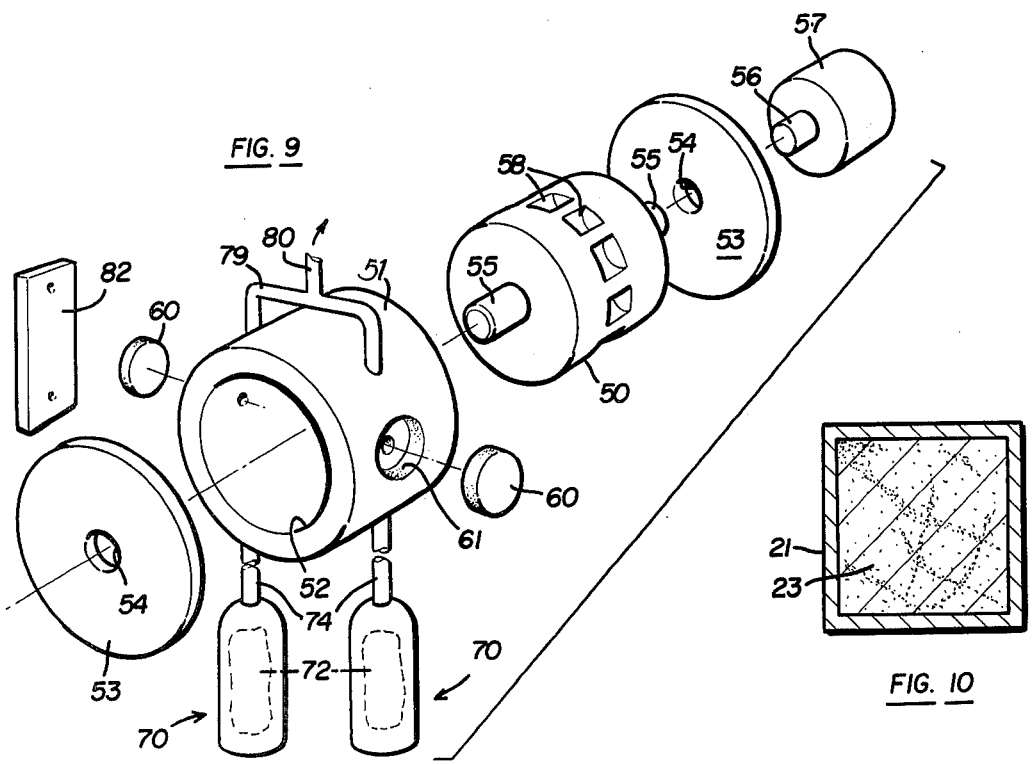
FIG. 9
FIG. 10

APPARATUS FOR VIBRATION WELDING THERMOPLASTIC PARTS

BACKGROUND OF INVENTION

One way of fastening thermoplastic parts together is by the technique of vibration welding. That is, two thermoplastic parts which are to be fastened together are placed into contact and then rapidly vibrated so as to melt their points of contact due to the heat generated by the friction caused by the vibration. Upon solidification, the two parts are welded together. In essence, the two plastic parts are held together tightly and one is rapidly moved back and forth relative to the other to produce friction generated heat.

The technique of vibration welding is useful in producing large numbers of welded together parts at relatively low cost. For this purpose, various types of equipment have been developed in the past. However, because the technique involves applying a relatively rapid vibration, prior equipment has been heavy, large, and expensive. Particularly, the motors used for vibration purposes have been expensive and limited in frequency of vibration. Another disadvantage of previously available equipment has been the necessity for bulky and expensive supporting means to hold the vibrating portions of the apparatus.

Thus, the invention herein relates to a vibration apparatus for rapidly vibrating thermoplastic parts for welding purposes, which apparatus is considerably simpler in construction, less bulky, and less expensive than prior available equipment and which will produce a rapid, low amplitude vibration. The equipment herein has as one objective the performance of the entire operation of vibration for suitable heating, stopping of the vibration and holding of the parts until the weld freeze occurs, in a very rapid time interval, as for example, from considerably less than one second up to several seconds.

SUMMARY OF INVENTION

The invention herein contemplates an apparatus for rapidly vibrating a thermoplastic member against another thermoplastic member to thereby frictionally generate heat at their points of contact to cause melting whereupon stopping of the vibration and holding the parts together momentarily results in the melted plastic freezing for welding purposes. The apparatus includes a fixed frame from which a vibratory beam is supported for carrying a vibration applying platten. The workpiece is supported upon a platten which can be moved towards and away from the vibration applying platten for either squeezing the two aligned plastic members together in contact or alternatively for positioning the support platten for loading and unloading.

The vibration of the beam is accomplished by means of a simple vibration motor which essentially consists of one or a pair of opposed pistons which move in one direction, i.e., longitudinally of the beam for longitudinal vibration thereof, under the application of a pressurized fluid. The application of the fluid to either or both of the pistons is controlled by means of a rotatable rotor having grooves formed in its surface in alignment with the cylinders containing the pistons so that each groove successively opens the piston cylinder to the source of pressurized fluid and then to a drain for thus causing rapid, short stroke movement of each of the pistons. Thus, the stoke of each piston is controlled by the peripheral speed of the rotor and each rotation produces multiple strokes.

The vibratory beam, is supported from the frame by means of a plurality of thin, narrow, relatively rigid or stiff metal strips each having one end secured to the beam and its opposite, upper end, secured to a crossmember of the frame. These strips are inherently sufficiently resilient or flexible to permit the beam to vibrate for short amplitudes relative to the frame.

To stop vibration of the beam almost instantaneously and to return the beam to its initial starting position, a large number of coil springs are arranged at each opposite end of the beam between the beam end and the adjacent frame portion. Preferably, these coil springs are each fastened to the beam end and frame portion by embedding the end portions of the spring in a solidified mass of a plastic material in turn bonded to a metal plate fastened to either the beam end or the frame portion. Thus, the large number of springs, as for example twelve springs at each end of the beam, forms a part of the vibrating mass and upon discontinuance of the vibration, almost instantaneously returns the beam to its starting point and stops its vibration. The apparatus may include more than one beam, such as a pair of them, formed the same way as described above, with either the single beam or the pair supporting a vibration platten so that upon vibration, the contact between the platten and one of the plastic members causes the vibration of that plastic member. The stopping of the vibration causes an instantaneous holding of the parts against vibration for solidification and welding of the melted plastic.

By way of example, the apparatus contemplates a vibration of approximately 230 vibrations per second with an amplitude of 30 to 100 thousands of an inch. The force pushing the two plastic parts together and holding them during vibration can be on the order of 200–300 psi so that the total vibration time of a typical pair of thermoplastic parts could run from 1/5 of a second to 3 seconds and a short holding time, such as a fraction of a second will suffice to permit welding upon cessation of the vibration.

Naturally, the times of vibration, the forces applied, and the times required for welding will vary depending upon the materials, configurations of materials, sizes and shapes of the contacting portions, etc., so that this is within the skill of the engineer. The above figures were given as illustrative examples for materials such as typical polycarbonates or acrylics as are commercially available and commonly used.

As can be seen, an object of the invention is to simplify the vibration motor so that it will produce a rapid vibration with relatively simple, inexpensive and relatively low mass parts which have a long life and are easy to maintain. Likewise, another object is to provide the overall apparatus out of a simple structure which has sufficient strength to absorb the vibrations and perform the function.

These and other objects and advantages of this invention will become apparent upon reading the following description, of which the attached drawings form a part.

DESCRIPTION OF DRAWINGS

FIG. 1 is an enlarged, cross-sectional, fragmentary view showing the plastic work pieces held together between platten mold parts.

FIG. 2 is a cross-sectional, plan view taken in the direction of arrows 2—2 of FIG. 3.

FIG. 3 is a elevational view, partially in cross-section, of the vibration apparatus.

FIG. 4 is a cross-sectional view taken in the direction of arrows 4—4 of FIG. 3.

FIG. 5 is a perspective view of the vibration apparatus.

FIG. 6 is an enlarged, cross-sectional, fragmentary view of the connection between the vibratory beam and its support.

FIG. 7 is a view taken in the direction of arrows 7—7 of FIG. 6 showing the spring mountings.

FIG. 8 is an enlarged, schematic, cross-sectional view of the vibratory motor, and FIG. 9 is a perspective view of the motor parts disassembled.

FIG. 10 is a cross-sectional view of a frame post.

DETAILED DESCRIPTION

Referring to FIG. 1, the object of the apparatus is to produce a welded plastic part or work-piece 10 which is formed of pre-formed work-piece halves or parts 11 and 12. The upper half is positioned within corresponding cavities or depressions 13 in an upper vibratory platten mold 14. The lower half 12 is positioned within corresponding cavities or openings 15 in a lower workpiece supporting mold 16. Hence, the two halves are aligned and squeezed together so that they can be welded together where they contact each other. The weld line or weld points is schematically designated as 17.

Once the two halves are welded together, the completed plastic part is removed from the apparatus. Examples of parts of the type referred to here are commonly found in the automotive industry, such as plastic light parts, body molding parts, etc., which consist of a pair of pre-formed plastic molded elements which are to be welded together to form a composite structure, such as the light containing compartment for enclosing several lights at the rear end of an automobile.

The types of plastics utilized in the apparatus herein may vary considerably, but basically these are of thermoplastic materials which are of a composition and nature as to lend themselves to vibration types of weldings. Such materials are commercially known and available.

Turning to FIGS. 2-5, the vibration apparatus includes a frame 20 formed of vertical posts 21 interconnected by horizontal beams 22. Preferably these posts and beams are made of hollow tubing, such as the rectangular or square shape tubing shown in FIG. 10 and are filled with sand 23 for vibration dampening.

Suspended within the frame are a pair of vibration beams 25.

These beams are supported by metal I-beam shaped strips 26 whose lower ends may be welded to the vibration beams and whose upper ends are fastened, mechanically such as by welding or mechanical fasteners, to a support plate 27 secured to the bottoms of the frame beams 22. These I-beam shaped strips have a limited inherent resiliency to permit the vibration beams to vibrate or move in a vibratory manner in a longitudinal direction, i.e., longitudinally of the vibration beams.

Dish-like end plates 29 are secured to the opposite ends of the vibration beams. A suitable plastic filling 30 fills these plates for surrounding and anchoring the embedded ends of coil springs 31. The opposite ends of the springs are fastened within spring support, dish-like plates 32 which are also filled with a plastic filler 33 for embedding and anchoring the opposite ends of the springs. Numerous springs are used, such as on the order of 9 to 12 coils springs for each end of each beam.

The plastic fillers for the plates may be selected from any suitable hard plastic material which can be easily poured and set in place for embedding and securing the springs.

The spring support plates 32 at one end of the vibratory beam are fastened to a box-like fixed support structure 34 connected to the frame posts. The opposite end spring support plates are engaged with a vibration motor 35 which is mounted within a box-like support structure 36 secured to the opposite support posts.

Vertical guide plates 37 are mounted by box-like structures 38 formed of metal plates, to the frame posts. Beneath the guide plates are located horizontal rails 39 extending forwardly or outwardly of the apparatus for supporting a tray-like lower platten 40 (see FIG. 5). A number of end rollers or wheels 41 rotatably mounted upon the platten ride upon the rails 39 so that the platten can be moved outwardly of the apparatus for loading parts and moved inwardly of the apparatus for positioning the parts.

Guide rollers 42, which are horizontally axised are mounted by suitable brackets upon the opposite ends of the platten 40 for rolling along the surfaces of the adjacent vertical guide plates 37 to maintain the moving platten in proper alignment.

The lower platten is moved upwardly and downwardly by means of hydraulic lifts or jacks 43 which include piston rods 44 fitted within cylinders 45 connected to a suitable control means (not shown) for actuating the lifts or jacks to raise or lower the platten as required.

Referring to FIGS. 8 and 9, the vibration motor 35 includes a rotor 50 and a housing 51 having a central rotor chamber 52 for containing the rotor. End covers 53 fasten over the housing and are provided with suitable bearings, illustrated schematically as journall-like openings 54 for mounting and journalling rotor end shafts 55.

The rotor end shafts are connected to a drive shaft 56 of an electric drive motor 57 for rotating the rotor at a uniform, pre-selected speed.

The rotor is provided with a number of grooves 58 spaced around its periphery, as for example 8 grooves. Aligned with these grooves are a pair of opposed pistons 60 arranged within cylinders 61 formed in the housing. The cylinders are provided with fluid chamber inner end portions 62 connecting, through cylinder inlets 63 to the rotor chamber. These inlets are aligned with the rotor grooves 58.

Fluid-inlet passageways 64 extend through the housing to open into the rotor chamber. These passageways are connected together by a common fluid inlet passageway 65, in turn opening into a fluid inlet pipe 66 which is connected to a reservoir tank 67 (see FIG. 5) located upon the top of the apparatus frame. Connected to this tank is a pump 68 driven by an electric motor 69 for pumping fluid from the reservoir through tubing (not shown) to the inlet pipe 66 (shown in FIG. 8).

Pressure stabilizing accumulators 70 are connected to each of the fluid inlet passageways 64. These accumulators are formed of metal containers or tanks 71 within which are located resiliently flexible bladders 72 containing a compressable gas 73. The tanks are connected through tubes 74 to the fluid inlet passageways 64.

The pressurized gas within the bladders tends to force fluid within the tanks into the fluid inlet passageways or alternatively when the pressure in the passageways exceeds the pressure of the bladders, the fluid returns the opposite way, i.e., back into the tanks. In this way, the accumulators tend to provide an even pressure of inlet fluid and to stabilize the pressure flow of fluid from the reservoir, eliminating any pulses of pressure.

Fluid drain passageways 78 extend through the housing to the rotor chamber. These passageways are connected, through a common connector 79 to a drain outlet tube 80 which in turn is connected to the reservior tank 67 for return of the fluid from the motor to the reservoir.

In operation, the rotor is operated at a predetermined rotational speed which thus causes each of the piston cylinder inlets to communicate with the rotor grooves. Momentarily, one rotor groove communicates the fluid inlet passageway with the cylinder passageway for applying pressurized fluid into the cylinder and thereby moving its piston outwardly of the rotor. At the same time, another rotor groove communicates the opposite piston cylinder inlet with the drain passageway so that its fluid can be drained from its piston for movement of such piston inwardly of the rotor. Consequently, there is a very rapid inward and outward movement of each piston, working simultaneously, in response to the rotational speed of the rotor multiplied by the number of grooves. The amplitude or length of movement of each piston is preferably kept low, but the number of movements is relatively high. For example, a vibration of in excess of 200 vibrations per second can be achieved. Roughly 220 vibrations per second is satisfactory for rapidly welding many of the common types of plastics used for automotive parts.

The vibration of the motor, i.e., the piston movement, is transferred to the vibration beam through one of the end plates 29 and its coil springs 31, as indicated in FIG. 8. Thus, the plate is connected directly or through a mechanical connection to one of the pistons and the opposite piston is connected to the same plate by attaching a piston plate or rod 82 to such opposite piston and then tying that by suitable tie rods 83 back to the plate 32. In that manner, one piston, moving outwardly of the rotor, moves the vibratory beam longitudinally in one direction and simultaneously causes its opposite piston to move inwardly of the rotor and then the movement is reversed.

The use of a number of grooves in the rotor produces a simple, inexpensive way of controlling and actuating the pistons. Each groove functions to open the piston to the pressurized fluid for moving it in one direction and to open it to the drain for return of the piston, with the land or space between adjacent grooves serving as a momentary seal. Thus, with relatively few moving parts, the large vibration can be produced. The vibration itself is translated into a longitudinal vibration to the vibratory beam through the springs which act as if they are a part of the vibrating mass. When the motor is stopped for discontinuing vibrations, the springs almost instantaneously stop the vibration of the beam and centralize the beam to position it and the plastic parts into the original, pre-vibration, position.

The vibration of the beam, which is so very rapid, in a short period of time, such as for example in a fifth of a second, can generate enough frictional heat on the mating surfaces of the plastic parts to melt the surfaces. The stopping of the vibration and the almost instantaneous repositioning of the parts and holding them together, as they are squeezed between the plattens, permits the melted surfaces to freeze together to produce the weld. Thus, the overall operation can be achieved in seconds or less making the apparatus suitable for high speed high production work.

The equipment embodying this invention may be further developed or modified within the scope of the attached claims.

Having fully described an operative embodiment of this invention, I now claim:

1. Apparatus for vibration welding thermoplastic parts together, comprising:
 a fixed support frame and an elongated vibration beam carried by said support frame;
 a vibration motor connected to the beam for vibrating the beam endwise, i.e., along its longitudinal axis;
 numerous, closely spaced, coil springs arranged between and in contact with each of the opposite ends of the beam and the adjacent fixed frame portions, with the springs being substantially axially aligned with the longitudinal axis of the beam, so that as the beam is vibrated longitudinally, the springs compress and expand in their axial directions in response to such vibrations;
 a vibratory platten rigidly secured to said beam for vibration therewith;
 a work-piece supporting platten aligned with the vibratory platten, and means mounting the work-piece supporting platten upon the frame for movement towards and away from said vibratory platten;
 whereby work-pieces to be welded together may be positioned in alignment upon the work-piece supporting platten which may then be moved towards the vibratory platten to squeeze the work-pieces together between the two plattens for tight contact between the parts of the work-pieces to be welded together, and thereafter the vibration motor may be operated for a short time to thereby cause vibration of the work-pieces and frictionally generated heat at their points of contact, to melt such points of contact, at which point the vibration motor may be stopped, resulting in the springs almost instantaneously stopping the beam vibration and centering the beam and the vibratory platten into their pre-vibration positions so that the melted points of contact solidify and weld together in alignment.

2. Apparatus as defined in claim 1 above, and including a fixed support frame portion spaced from and arranged substantially parallel to the vibration beam;
 a number of thin, substantially rigid, metal strips extending between said vibration beam and frame support portion and having their opposite ends secured to the adjacent vibration beam and frame support portions for thereby carrying the vibration beam upon the support frame;
 said strips extending in a direction transverse to the vibration beam and being at least slightly resilient to thereby permit vibrational endwise movement of the vibration beam relative to the support frame portion.

3. Apparatus as defined in claim 1, and said vibration motor including a piston arranged to reciprocate in the longitudinal direction of the vibration beam and being connected to such beam;

said piston being reciprocally fitted within a cylinder having a fluid chamber portion provided with a pressurized fluid inlet and a fluid outlet for receiving pressurized fluid to thereby move the piston axially in one direction and for draining the fluid, respectively;

and a rotatable rotor having means for rapidly rotating same, with peripheral grooves formed in the rotor surface, with the rotor being arranged axially perpendicular to the axis of reciprocation of the piston;

with the grooves being aligned with the fluid chamber and the inlet and outlet thereto for each groove successively overlapping and thereby interconnecting first the inlet with the fluid chamber for passage of pressurized fluid into the fluid chamber and second, the outlet and the fluid chamber for thereby draining same;

and a source of pressurized fluid connected to said inlet and outlet.

4. Apparatus as defined in claim 3 above, and including a second piston which is axially aligned with the first mentioned piston but located diametrically opposite of the first mentioned piston with respect to the rotor, with the second piston reciprocally arranged within a cylinder having a second fluid chamber having a second inlet and a second outlet which in turn are respectively opened into the fluid chamber by the rotor grooves which are positioned to successively expose one piston to the pressurized fluid while draining the fluid from the other piston and then vice versa;

said second piston being coupled to the beam for applying vibrations to the beam as well as causing the pistons to each move the other during their respective drain movements.

5. Apparatus as defined in claim 1, and said vibratory beam being horizontally arranged between vertical frame posts, wherein the coil springs are horizontally arranged between the ends of the vibratory beam and frame portions formed in connection with such posts;

said vibratory platten being arranged beneath and secured to the vibratory beam and the work-piece supporting platten being spaced beneath the vibratory platten in a horizontal plane and parallel to the vibratory platten;

means for lifting the work-piece supporting platten upwardly towards the vibratory platten and to lower said work-piece supporting platten downwardly for squeezing together the work-pieces to be welded and for loading and unloading same from the work-piece supporting platten, respectively.

6. Apparatus as defined in claim 1 above, and said frame being formed of hollow, metal posts and beam portions interconnected together to form a rigid frame structure;

with at least the hollow posts being filled with sand for vibration absorption.

7. Apparatus as defined in claim 1, and said coil springs being arranged close together to form a large group of springs with the opposite ends of the springs being embedded in a solidified plastic material layer bonded to metal plates, in turn secured to the adjacent frame portions and beam end.

* * * * *